Patented Sept. 15, 1953

2,652,375

UNITED STATES PATENT OFFICE 2,652,375

PRODUCTION OF ARTICLES OF IMPROVED WATER RESISTANCE FROM UREA-FORMALDEHYDE RESINS

David E. Cordier and William D. Williams, Toledo, Ohio, assignors to Libby-Owens-Ford Glass Company, Toledo, Ohio, a corporation of Ohio No Drawing. Application March 8, 1951, Serial No. 214,634

4 Claims. (Cl. 260—17.3)

The invention relates to the production of articles of greatly improved water resistance from urea-formaldehyde resins.

Articles molded from melamine-formaldehyde molding compositions and laminates prepared from melamine-formaldehyde resins have substantially greater water resistance than similar materials prepared from urea-formaldehyde products. However, melamine is considerably more expensive than urea so that melamine-formaldehyde products are more expensive than urea-formaldehyde products. Therefore, it has been necessary to use urea-formaldehyde materials in many applications for which the water resistance of urea-formaldehyde materials is not wholly satisfactory, but for which the cost of melamine-formaldehyde materials is too great.

Furthermore, melamine-formaldehyde compositions produce molded articles of inferior appearance (due to inherent yellow color and lack of translucency) which makes it impossible to use such compositions in certain applications for which high water resistance is desirable. For example, urea-formaldehyde buttons have been used in many cases in which melamine-formaldehyde buttons have been considered unacceptable because of their yellow color and their dead (opaque) appearance, in spite of the relatively poor resistance to laundering of urea-formaldehyde buttons.

The principal object of the invention is the production of articles of greatly improved water resistance from urea-formaldehyde resins. More specific objects and advantages are apparent from the description, which illustrates and discloses but is not intended to limit the invention.

Attempts have been made heretofore to produce molding compositions having the good qualities of both urea- and melamine-formaldehyde compositions by the use of combinations of urea and melamine. However, it has been found that substituting urea for some of the melamine used to produce a melamine-formaldehyde composition produces a disproportionate reduction in the water resistance and other qualities of articles molded from the composition. Similarly, in order to produce an appreciable improvement in the water resistance and other properties of a urea-formaldehyde composition it is necessary to substitute melamine for a very substantial proportion of the urea used in producing the composition. Thus it has been found to be entirely uneconomical to improve the quality of a urea-formaldehyde molding composition by substituting melamine for part of the urea used.

The present invention is based upon the discovery that when cellulose is impregnated with a relatively small proportion of a thermosetting reaction product of melamine and formaldehyde, and the reaction product is then converted to the infusible state, the use of the impregnated cellulose in a urea-formaldehyde molding composition or laminate gives articles having much greater water resistance than articles produced from a urea-formaldehyde molding composition or laminate prepared from the untreated cellulose filler. Although it has been found that a disproportionately small improvement is produced by merely substituting melamine for part of the urea used in producing a urea-formaldehyde molding composition, the use of the same proportion of melamine in accordance with the method of the present invention produces a disproportionately large improvement.

The remarkable improvement obtained in the practice of the present invention has been demonstrated as follows:

A cellulose filler impregnated with a thermosetting reaction product of formaldehyde and melamine was prepared by the following procedure: A reaction mixture consisting of melamine (57 grams) in formalin (110 grams of a 37 per cent commercial aqueous formaldehyde solution) was held for five minutes at temperatures ranging from 90 to 95° C. (The terms "per cent" and "parts" as used herein refer to per cent and parts by weight unless otherwise specified.) The resulting reaction mass was diluted with water to a volume of 1000 cc. Lactic acid (0.5 cc. of a 10 per cent solution) was added to adjust the pH to a range between 5 and 6. The resulting solution was then used to impregnate alpha cellulose (558 grams of which 6 per cent was water). The resulting impregnated filler was cured for three hours at a temperature of about 220° F. to yield a coarse, granular popcorn-like material. The dried "popcorn" (415 grams) was further impregnated with a mixture of (1) a urea-formaldehyde reaction product solution (1170 grams), prepared by maintaining a solution of urea (390 grams) in formalin (790 grams of a commercial 37 per cent aqueous formaldehyde solution) at a temperature of about 30° C. and a pH of 7 for six hours) and (2) lactic acid (2 cc. of a 10 per cent solution). The impregnated material was dried for approximately 60 minutes at a temperature of about 185° F. and was then ground in a ball mill with 0.1 per cent of hexamethylene tetramine, 0.25 per cent of o-sulfamido methylbenzoate, 1.0 per cent of toluene sulfonamide, and 0.5 per cent of zinc stearate (the percentages being based on the dried impregnated material) to obtain a powdered molding composition of the invention, A.

A cellulose filler impregnated with a thermosetting reaction product of formaldehyde and urea was prepared as follows: A urea-formaldehyde reaction product solution (195 grams prepared by the procedure described in the preceding paragraph) was diluted with water to a volume of 1000 cc. This solution along with lactic acid (3 cc. of a 10 per cent solution), was subsequently absorbed on alpha cellulose (558 grams of which 6 per cent was water). The impregnated filler so obtained was dried at a temperature of about 185° F. for two hours, and then cured at a temperature of about 220° F. for three hours and then at a temperature of about 200° F. for an additional 16 hours. The completely dry popcorn (415 grams) was further impregnated with a mixture of a urea-formaldehyde reaction product solution prepared as hereinbefore described (1170 grams) and lactic acid (3.5 cc. of 10 per cent solution). The impregnated material so obtained was dried at a temperature of about 185 degrees F. for 35 minutes and was then ground in a ball mill with the same ball mill additives used in preparing composition A, to obtain a control molding composition, B.

A solution of melamine (37.9 grams) in formalin (37 grams of a 37 per cent commercial aqueous formaldehyde solution) was held at a temperature of about 80° C. for 10 minutes to produce a solution of a melamine-formaldehyde reaction product. This solution was then mixed with a solution of a urea-formaldehyde reaction product prepared as hereinbefore described (1170 grams) and the resulting urea-melamine resin solution along with lactic acid (8.5 cc. of a 10 per cent solution) was absorbed on alpha cellulose (373 grams) of which 6 per cent was water. The impregnated material so obtained was dried at a temperature of about 185 degrees F. for 40 minutes, and was then ground in a ball mill together with the ball mill additives hereinbefore described to obtain a second control molding composition, C.

A solution of a urea-formaldehyde reaction product (1300 grams) prepared as hereinbefore described, along with lactic acid (5.5 cc. of a 10 per cent solution) was absorbed on alpha cellulose (373 grams of which 6 per cent was water). The material so obtained was dried at a temperature of about 185 degrees F. for 40 minutes, and the dried material was ground in a ball mill together with the ball mill additives hereinbefore described to obtain a third control molding composition, D.

Compositions A, B, C and D were molded under one to four tons of pressure per square inch of projected area for various periods of time (i. e., ¾, 1, 2, 3, 4 and 5 minutes) in a mold heated by 75 pounds steam to produce small disks suitable for testing water resistance. The water resistance of a disk molded from each composition for each period of cure was measured by immersing it in boiling water for 15 minutes. The results obtained for each test piece are shown in Table 1 below, as the gain in weight (in grams) during immersion. (Water resistance, of course, varies with the amount of moisture that an article is capable of absorbing because the degree of deterioration upon exposure to moisture varies with the amount of moisture absorbed.) After the water absorption determination, each test piece was dried for four days at a temperature of about 90° F. The condition of each test piece after the drying operation is indicated directly below the water absorption results as OK (unaffected), sl. cr. (slightly cracked), v. sl. cr. (very slightly cracked) or cr. (cracked).

TABLE 1

| Molding Composition | Resinous Reaction Product | Filler | Water Absorption—Cure time (min.) | | | | | |
|---|---|---|---|---|---|---|---|---|
| | | | ¾ | 1 | 2 | 3 | 4 | 5 |
| A | Urea-formaldehyde | Melamine-formaldehyde impregnated cellulose. | .145 / v. sl. cr. | .125 / OK | .095 / OK | .090 / OK | .085 / OK | .085 / OK |
| B | do | Urea-formaldehyde impregnated cellulose. | .195 / cr. | .170 / v. sl. cr. | .140 / v. sl. cr. | .135 / v. sl. cr. | .135 / v. sl. cr. | .145 / cr. |
| C | Melamine-Urea-formaldehyde | do | .195 / cr. | .190 / cr. | .135 / sl. cr. | .125 / v. sl. cr. | .125 / cr. | .130 / cr. |
| D | Urea-formaldehyde | do | .175 / cr. | .170 / cr. | .150 / cr. | .145 / cr. | .155 / cr. | .165 / cr. |

As the results in Table 1 indicate, a urea-formaldehyde molding composition of the invention, A, which comprises a cellulose filler impregnated with a thermosetting reaction product of formaldehyde and melamine, can be molded to produce articles having considerably higher water resistance than a urea-formaldehyde molding composition which comprises an ordinary cellulose filler, control D. Furthermore, the improvement in water resistance obtained in accordance with the present invention cannot be achieved by merely substituting urea for melamine in producing a pre-impregnated filler which is then impregnated with a urea-formaldehyde reaction product, control B. Nor is the present improvement in the water resistance of a urea-formaldehyde molding composition obtained by using an ordinary filler but substituting a small amount of a melamine-formaldehyde reaction product for part of the urea-formaldehyde reaction product, control C. (The proportion of the melamine-formaldehyde reaction product used in control composition C is the same as the proportion used to impregnate a cellulose filler in the composition of the invention, A.)

As the results in Table 1 also indicate, the composition of the invention, A, shows considerably greater resistance to cracking upon subjection to extreme changes of temperature and humidity than any of the three control compositions, B, C and D.

To demonstrate further the superiority of articles molded from compositions of the instant invention, composition A of the invention and control composition D were used to mold tumblers for a typical tumbler cracking test. Standard tumblers (e. g., tumblers 4 inches high having a bottom diameter of 2¼ inches and a top diameter of 3 inches) were molded between the plates of a 20 ton hydraulic press and then were tested as follows:

In each cycle of the test the tumblers were filled with water and were placed in a vented oven that was maintained at a temperature of about 140° F., for a total time of 24 hours. The test, therefore, provided an accelerated fracture-producing effect of water evaporating from a molded article in an atmosphere of warm air. At the end of each cycle of this test the tumblers had been throughly dried and thoroughly emptied of their contents by evaporation.

A tumbler molded from composition A of the invention showed no cracking after 15 cycles of the above procedure. However, a tumbler molded from control composition D was badly cracked after only 7 cycles. It is apparent from these results that molding compositions of the invention produce molded articles of greater heat resistance and of greater water-resistance than articles produced from urea-formaldehyde molding compositions comprising an ordinary cellulose filler.

The method of the present invention, which produces a material that can be hot-pressed to produce articles of greatly improved water resistance, comprises impregnating cellulose with a thermosetting reaction product of formaldehyde and a substance whose molecule has a plurality of $NH_2$ groups each connected to a carbon atom contained in a heterocyclic ring, the carbon atom being connected by a double bond to an intracyclic nitrogen atom, converting the reaction product to its infusible state, and then impregnating the cellulose with a thermosetting urea-formaldehyde reaction product.

*Cellulose*

When the material produced by the present method is a molding composition of the invention, various forms of cellulose may be used as the filler to be impregnated with a resinous reaction product. For example, cellulose materials which may be used include rag fillers, wood flour, paper pulp, newsprint, printed newspaper, sawdust, shavings, walnut shell flour, ground corn cobs, regenerated cellulose, and alpha cellulose. Alpha cellulose, however, is preferred because it imparts better chemical and physical properties to a molding composition.

When the material produced by the present method is a laminating material, the cellulose to be impregnated may consist of sheets of cellulose paper or cellulose cloth.

*Heterocyclic polyamine-formaldehyde reaction product*

For the sake of brevity, a substance whose molecule has a plurality of $NH_2$ groups each connected to a carbon atom contained in a heterocyclic ring, said carbon atom being connected by a double bond to an intracyclic nitrogen atom, is hereinafter referred to as a "heterocyclic polyamine."

A heterocyclic polyamine that may be reacted with formaldehyde to form a thermosetting reaction product which may be used to impregnate cellulose in accordance with the present method may be (a) a substance whose molecule has a plurality of $NH_2$ groups each attached to a nuclear carbon atom in a triazole ring, such as guanazole,

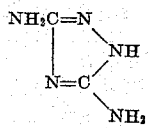

1-phenyl guanazole

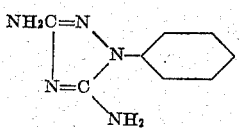

4-aminoguanazole

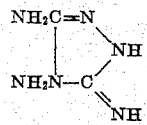

1-carbamyl guanazole

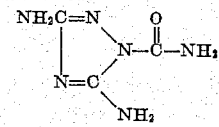

1-guanyl guanazole

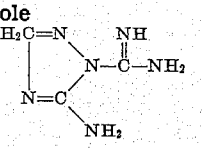

1-acetyl guanazole

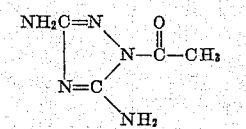

or 1-benzoyl guanazole

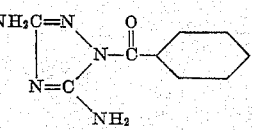

(b) a substance whose molecule contains a plurality of $NH_2$ groups each attached to a nuclear carbon atom in a diazine ring, e. g., a pyrimidine such as 2,4-diamino-6-hydroxy pyrimidine,

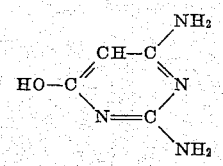

or a quinazoline such as 2,4-diaminoquinazoline,

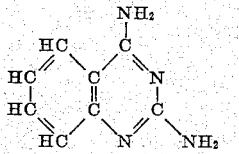

or (c) a substance whose molecule contains a plurality of $NH_2$ groups each attached to a nuclear carbon atom in a triazine ring, having from one to three triazine rings, and having no functional groups attached to a triazine ring other than the amino groups (such as an amino triazine). The term "functional group" as used herein means any radical in a molecule of such a substance which may enter into undesirable side reactions that interfere with the reaction of formaldehyde with the amino triazine in the production of compositions of the invention (e. g., an OH group attached to a triazine ring may react with formaldehyde during the production of a thermosetting amino triazine-formaldehyde condensation product).

Such a substance may be a triamino triazine, e. g., melamine,

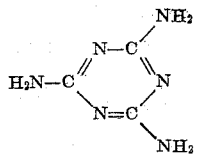

or a diamino triazine (i. e., a monoguanamine) having the general formula

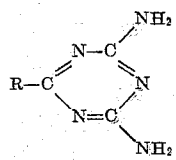

wherein R is a hydrogen atom, a saturated monovalent aliphatic hydrocarbon radical having from 1 to 18 carbon atoms, an aromatic hydrocarbon radical containing 1 benzene nucleus or containing 2 condensed benzene nuclei, a saturated or unsaturated cycloaliphatic hydrocarbon radical, or any of the foregoing radicals containing substituents such as aliphatic, cycloaliphatic, aromatic, alkoxy, aryloxy and acyl radicals. Thus, the monoguanamines used may have varying structures and may be of complex structure so long as they do not contain groups which interfere with the condensation reaction of formaldehyde with the guanamine in the practice of the invention. Such monoguanamines include, Formoguanamine,

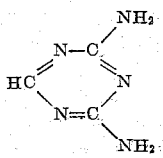

Acetoguanamine,

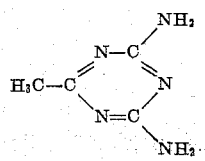

Propioguanamine,

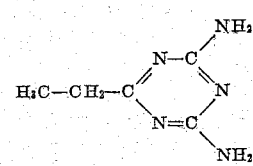

Butyroguanamine,

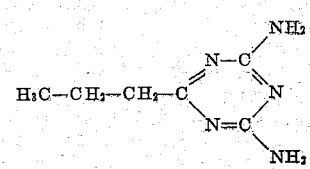

Benzoguanamine,

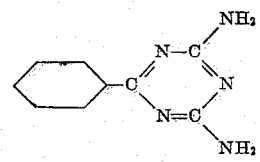

Phenylacetoguanamine,

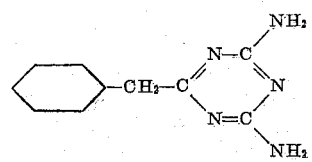

Delta-cyano-valeroguanamine,

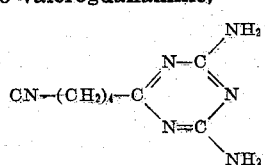

and monoguanamines obtained from the corresponding mononitriles containing as many as 18 carbon atoms, e. g., dodecano-, tetradecano-, or octadecano-nitrile. A substance whose molecule contains a plurality of NH₂ groups (as hereinbefore described) may also be a diguanamine having the general formula

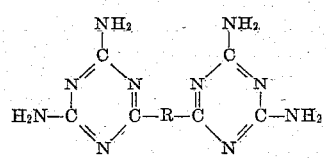

wherein R is a divalent hydrocarbon radical in which the shortest connection between the free valences is not more than eighteen carbon atoms in series and which contains no substituents or contains substituents such as aliphatic, cycloaliphatic, aromatic, alkoxy, aryloxy and acyl radicals, or may be a compound having said general formula that is substituted on not more than two exocyclic nitrogen atoms, the substituents consisting of (a) not more than two monovalent aliphatic hydrocarbon radicals on each substituted nitrogen atom, each having not more than four carbon atoms, each having at least one hydrogen atom attached to the same carbon atom as the free valence, and each having not more than one unsaturation, any such unsaturation being an olefinic unsaturation in the beta-gamma position, (b) not more than one monovalent radical of the benzene series on each substituted nitrogen atom having not more than eight carbon atoms in which the free valence is connected to the nucleus, and (c) not more than one monoalkoxy phenyl radical on each substituted nitrogen atom having not more than eight carbon atoms. Thus the diguanamines used may have varying structures and may be of complex structure so long as they do not contain groups which interfere with the condensation reaction of formaldehyde with the diguanamine in the practice of the invention. Such diguanamines include gamma-methyl-gamma-acetyl pimeloguanamine,

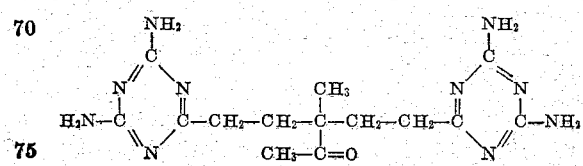

Sebacoguanamine,

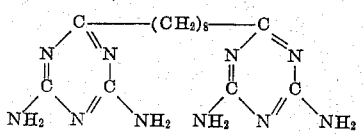

Adipoguanamine,

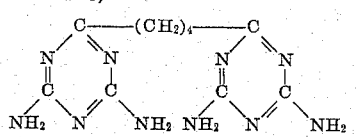

Bis-(4,6-diamino-2-triazinyl-ethyl) fluorene,

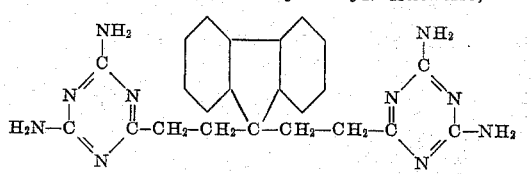

Gamma-isopropenyl-gamma-acetyl pimeloguanamine,

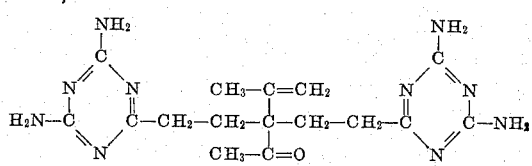

Sym.-diphenyladipoguanamine,

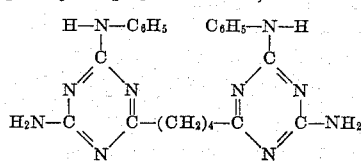

Phthaloguanamine,

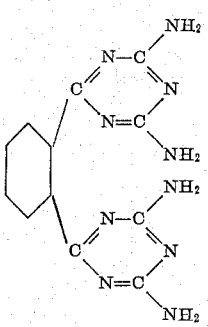

p,p'-Bis-2,4-diamino-6-triazinyl diphenyl,

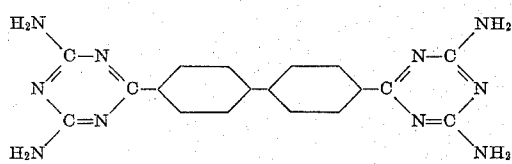

1,2-bis-2,4-diamino-6-triazinyl naphthalene,

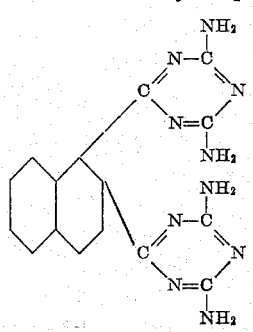

sym. - diphenylsebacoguanamine, sym. - di - p-phenetyladipoguanamine, sym.-di-o-tolyladipoguanamine, terephthaloguanamine and diguanamines obtained from nitriles such as 2,4-dicyanodiphenyl, 4,4' - dicyanodiphenyl methane, 4,4'-dicyanodiphenyl ethane, and 4,4'-dicyano-alpha,gamma-diphenyl propane. The polyguanamines which may be used in the practice of the invention include triguanamines such as gamma-2,4-diamino-6-triazinyl-gamma - phenylpimeloguanamine.

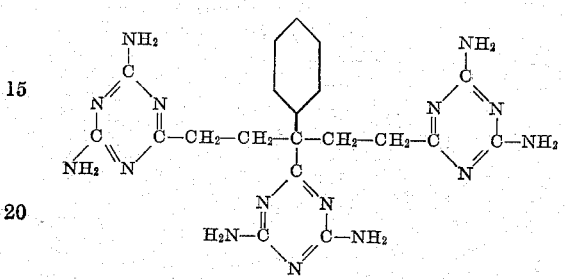

A guanamine which contains one or a plurality of 2,4-diamino-6-triazinyl radicals (e. g., a monoguanamine, diguanamine or triguanamine) may be prepared by condensing the corresponding mononitrile, dinitrile or trinitrile with dicyanidiamide. The nitrile which reacts with the dicyandiamide must be a specific type of nitrile, namely, a nitrile whose molecule contains a cyano radical attached to a saturated carbon atom. In other words, the carbon atom to which the cyano group is attached must not be unsaturated and must not become unsaturated under the reaction conditions. In a nitrile used in a reaction with dicyandiamide as described herein, a nuclear carbon atom in an aromatic ring structure (e. g., an atom in a benzene nucleus) is considered to be saturated.

A mononitrile or polynitrile which may be used in the preparation of a guanamine for use in the present invention may be the nitrile corresponding to a monocarboxylic acid or a polycarboxylic acid, for example, any normal aliphatic carboxylic acid in the series from acetic acid to octadecanoic acid, or in the series from malonic acid to octadecane 1,18-dicarboxylic acid, any benzene carboxylic acid, or an aromatic carboxylic acid containing two condensed benzene nuclei or two benzene nuclei connected directly or connected by from one to twelve atoms in series, a saturated or unsaturated alicylic carboxylic acid, the dimer of linoleic acid, or an acid obtained by substituting in the molecule of any of the foregoing acids substituents such as aliphatic, cycloaliphatic, aromatic, alkoxy, aryloxy and acyl radicals. Examples of such nitriles include acetonitrile, propionitrile, butyronitrile, valeronitrile, stearonitrile, succinonitrile, glutaronitrile, pimelonitrile, adiponitrile, sebaconitrile, azelaonitrile, octadecanedinitrile, benzonitrile, phthalonitrile, terephthalonitrile, cyanonaphthalene, dicyanophthalene, 2,4'-dicyanodiphenyl, 4,4'-dicyanodiphenyl methane, 4,4'-dicyanodiphenyl, 4,4'-dicyanodiphenyl ethane, 4,4' - dicyanoalphagamma - diphenyl propane, 4,4'-dicyanodiphenyl ether, 4-cyanophenyl 4-cyanobenzyl ether, 4,4'-dicyanodibenzyl ether, the ethers formed by the reaction of two molecules of a hydroxy benzonitrile (e. g., 4-hydroxy benzonitrile) with one molecule of the dibromide corresponding to a glycol in the series from methylene gylcol to decylene glycol or to diethylene or triethylene glycol, gamma-methyl-gamma-acetylpimelonitrile, gamma-isopropenyl-gamma-acetylpimelonitrile, bis-cyanoethyl fluorene, 4,4'-dicyanobenzophenone, phenylacetonitrile, gamma-cyano-gamma-phenylpimelonitrile and the dinitrile corresponding to the dimer of linoleic acid.

In the preparation of a guanamine by the condensation of a nitrile with dicyandiamide, widely different molal proportions may be used. However, in the preparation of a monoguanamine the preferred proportion ranges from about 1 mol to about 1.5 mols of dicyandiamide for each mol of the nitrile (preferable a mononitrile) and the best results are obtained when the molal proportion is about 1.2 mols of dicyandiamide for each mol of the nitrile. In the preparation of a diguanamine the preferred proportion ranges from about 2.2 to about 2.6 mols of dicyandiamide for each mol of the nitrile (i. e., a dinitrile) and the best results are obtained by using about 2.4 mols of dicyandiamide for each mol of the nitrile. Correspondingly, in the preparation of a triguanamine the preferred proportion of dicyandiamide is slightly greater than 3 mols (i. e., about 3.6 mols) for each mol of the nitrile (i. e., a trinitrile).

The condensation of a nitrile with dicyandiamide is carried out by dissolving a strongly basic catalyst in a suitable primary or secondary alcoholic solvent such as benzyl alcohol or ethylene glycol mono-methyl ether, adding the nitrile and the dicyandiamide in a proportion within the range hereinbefore described, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When the precipitation of the guanamine is complete, the precipitate is filtered off and washed with boiling water to remove excess dicyandiamide and products of side reactions. The guanamine may be purified by converting it to a hydrochloride and neutralizing an aqueous solution of the hydrochloride to liberate the guanamine.

This method of preparation is versatile in that a large variety of nitriles may be used for the reaction with dicyandiamide, to give a wide variety of guanamines.

The nitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the nitrile by dehydration of the amide or directly from the carboxylic acid.

Diguanamines in which one or two of the exocyclic nitrogen atoms are substituted, as, for example, sym.-diphenyladipoguanamine, hereinbefore mentioned, may be prepared by various methods. One method consists in reacting 1-phenyl biguanide, 1-o-tolyl biguanide, 1-m-tolyl biguanide, 1-p-tolyl biguanide, 1-(2,5-dimethyl phenyl) biguanide, 1-methyl-1-phenyl biguanide, 1-p-phenetyl biguanide or 1-ethyl-1-phenyl biguanide with sodium carbonate and adipyl chloride or the dichloride of any other dicarboxylic acid in chlorobenzene. Another method consists in reacting any of the aforementioned aryl or alkyl aryl biguanides or 1-methyl biguanide, 1-ethyl biguanide, 1-propyl biguanide, 1-butyl-biguanide, 1-allyl biguanide, 1-crotyl biguanide, 1,1-dimethyl biguanide, 1,1-diethyl biguanide or 1,1-diallyl biguanide, with the diethyl or dimethyl ester of adipic acid or any other dicarboxylic acid in the presence of an alkoxide catalyst. Still another method consists in reacting an alkyl or aryl dicyandiamide such as phenyl dicyandiamide with adiponitrile or the dinitrile of any other dicarboxylic acid.

A thermosetting heterocyclic polyamine-formaldehyde reaction product may be obtained by reacting a heterocyclic polyamine, as hereinbefore defined (or a mixture of such amines), either with formaldehyde or with a polymer thereof, such as paraformaldehyde. When used for this reaction, paraformaldehyde is considered to split up so that the substance actually taking part in the reaction is formaldehyde. The heterocyclic polyamine may be reacted with a solution of formaldehyde in water, in an organic solvent such as an alcohol, or in a liquid containing both water and an organic solvent. A water solution is usually preferred because it swells the cellulose, permitting a more efficient impregnation by the resinous reaction product. The reaction may be performed in an autoclave, if desired, to secure a reaction temperature above the boiling point of the solvent. The heterocyclic polyamine may be added to an ordinary commercial aqueous formaldehyde solution having a pH of about 4, or to such a solution which has been made less acid, or neutral, or alkaline, preferably at a pH between 6 and 8, by addition of any desired base, such as sodium hydroxide, ammonium hydroxide, borax, or triethanolamine.

In general, the proportion of formaldehyde actually reacting may range from one-half to a maximum of two molecules for each amino group. An excess of formaldehyde above this maximum may be used for the reaction if desired, although an uncombinable excess of one of the reactants usually is not desirable in the final product. Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is melamine, the preferred proportions are about 3 mols of formaldehyde for each mol of melamine. Other examples of preferred molar ratios of formaldehyde to a heterocyclic polyamine in the preparation of a resinous reaction product for the impregnation of a cellulose filler in the practice of the invention are 2:1 for guanazole or 1-carbamyl guanazole, 4:1 for 2,4-diamino-6-hydroxy pyrimidine, 3:1 for 2,4-diamine quinazoline, 2:1 for formoguanamine, acetoguanamine or benzoguanamine and 5:1 for adipoguanamine or sebacoguanamine.

The reaction proceeds at normal temperatures, but heating ordinarily is desirable to shorten the time of reaction, or, in some cases, to dissolve the substance to be reacted with formaldehyde. The desired resin solution ordinarily is obtained by carrying the reaction only to its earliest stage, for example, the stage at which the reacting ingredients have just dissolved to form a solution, or for a few additional minutes thereafter.

When the reaction between formaldehyde and a heterocyclic polyamine is substantially complete, the solution of the reaction product is used to impregnate cellulose by the procedure hereinafter described. The preferred heterocyclic polyamine in the practice of the invention is melamine, since melamine-formaldehyde resin-treated cellulose imparts superior properties to molding compositions and laminating materials in the practice of the invention.

*Preparation of resin-treated cellulose fillers*

For the sake of brevity, a cellulose filler which has been impregnated with a thermosetting reaction product of formaldehyde and a heterocyclic polyamine is hereinafter referred to as a "resin-treated filler." In the preparation of a resin-treated filler, a heterocyclic polyamine-formaldehyde reaction product solution, prepared as hereinbefore described, is diluted with water or any suitable solvent so that the weight of the diluted solution is from two to three times the weight of the cellulose to be treated. (The weight of the cellulose is always taken as its bone dry weight. The cellulose employed need not be bone dry, of course, so long as its water content is accounted for in calculating its weight.) The dilution should be made carefully so that the resin does not precipitate as the water is added. It is desirable that the pH of the resin solution be adjusted (e. g., with dilute lactic acid) so that it is on the slightly acid side, since the resin cures to its infusible state on the filler more rapidly in a slightly acid condition. (The preferred pH varies in accordance with the particular heterocyclic polyamine-formaldehyde reaction product solution employed. Melamine-formaldehyde reaction product solutions are preferably used at a pH between 5 and 6.)

When the reaction product has thoroughly impregnated the cellulose filler, it is essential that the material be thoroughly dried and that the resinous reaction product be cured on the filler to the infusible state. Although the slightly acid pH of the impregnating solution aids the cure initially, several hours of heating may be necessary at an elevated temperature to completely "deaden" the resinous substance. (Melamine-formaldehyde resins derived from solutions having a pH between 5 and 6 usually cure in about three hours at temperatures ranging from 200° to 225° F.) The completeness of cure may be checked from time to time during the curing operation by boiling a sample of the treated filler in water. If the cure is still incomplete, a cloudy solution will result because of dissolved resinous reaction product. On the other hand, if the solution is clear, complete cure is indicated.

The proportion of a heterocyclic polyamine-formaldehyde reaction product solution used to impregnate a cellulose filler should be such that from 2.5 to 40 per cent of the final treated dry filler consists of the heterocyclic polyamine-formaldehyde reaction product in its infusible state. It is preferred that the proportion of the reaction product solution be such that from about 14 to about 25 per cent of the final treated filler consists of the reaction product in its infusible state.

If the heterocyclic polyamine used is one that reacts so rapidly with formalin that the reaction product reaches the insoluble stage almost immediately after the reactants are mixed and heated (guanazole is an example of such a heterocyclic polyamine) it is preferable simply to mix the polyamine and the formalin at room temperature and then to add the water of dilution, and the acid to adjust the pH. The relatively clear solution so obtained is then absorbed on a cellulose filler, which is thoroughly dried in accordance with the procedure hereinbefore described. Thus, the reaction between the heterocyclic polyamine and the formaldehyde actually takes place on the cellulose filler during the drying operation. The preparation of a resin-treated cellulose filler on a commercial scale can be accomplished in a paper pulp manufacturing plant. When paper pulp is prepared, sheets of dry pulp can be passed through a bath of a heterocyclic polyamine-formaldehyde reaction product and, after the resin absorption, the impregnated pulp sheets can be redried and rolled for shipment. Impregnation of the pulp in this manner would consist essentially of "tub sizing" the polyamine resin on the pulp while the pulp is being processed.

*Preparation of molding compositions*

In the preparation of a molding composition of the invention by the present method a resin-treated cellulose filler, prepared as hereinbefore described, is impregnated with a thermosetting urea-formaldehyde reaction product. The urea-formaldehyde reaction product may be prepared by reacting urea and formaldehyde in the preferred molar ratio of about two to three. A resin solution may be obtained by carrying the reaction only to its earliest stage, for example, the stage at which the reacting ingredients have just dissolved to form a solution, or by carrying the reaction to any further stage (short of the insoluble stage). By advancing the reaction, it is possible to obtain thermosetting urea-formaldehyde condensation products that are insoluble but still fusible. Such reaction products may be converted by heat into infusible resins. When the reaction is substantially complete, the resulting urea-formaldehyde resin is used to further impregnate a resin treated cellulose filler. It is usually preferable to render the resulting mixture acid (pH from about 4 to about 6). Heat may be used to facilitate the drying of the composition, but, of course, the drying temperature should not be sufficient to render a thermosetting molding composition infusible. The dry product may be ground in a ball mill to produce a homogeneous powder.

The proportions of urea-formaldehyde reaction product and resin-treated filler should be such that from about 20 to about 50 per cent of the final dry composition consists of resin-treated filler. It is preferred that from about 25 to about 35 per cent of the final dry composition consist of resin-treated filler, since articles molded from such compositions have superior properties.

Any of the known methods may be employed to grind or powder the molding materials. When the material is ground in a ball mill the customary additives, for example, plate lubricants, plasticizers, and curing catalysts of various types, may be easily incorporated. The amount used in the case of each of such additives is the usual amount consistent with its particular function in the molding composition.

It is well recognized that articles molded from ordinary urea-formaldehyde molding compositions have greater translucency than articles molded from melamine-formaldehyde molding compositions.

The translucency of articles molded from a urea-formaldehyde composition of the invention which comprises a melamine-formaldehyde resin-impregnated cellulose filler is equally as good as the translucency of articles molded from ordinary urea-formaldehyde molding compositions. Of course, translucency is a particular advantage in a plastic when it is accompanied by good water resistance. It is frequently desired to manufacture plastic articles, for example, buttons, that are translucent, colorful and water resistant so that they can undergo repeated launderings and still present a good appearance. While standard urea-formaldehyde articles possess good color properties (i. e., they do not have the inherent yellow color of melamine-formaldehyde plastics) and also possess a high degree of translucency, they are not sufficiently resistant to water to be useful in the manufacture of articles that are subjected to frequent moisture and temperature variations for prolonged periods of time. Melamine-formaldehyde plastics have good water resistance, but ordinarily they possess a yellowish appearance which frequently hinders color blending and hinders their use in, for example, the manufacture of shirt buttons and other plastic articles which must have the whitest appearance possible.

Furthermore, the heat resistance of articles molded from compositions embodying the invention is as good as the heat resistance of articles molded from standard urea-formaldehyde molding compositions. Good heat resistance is valuable, of course, for articles which undergo prolonged and frequent exposure to extreme temperature changes, e. g., articles such as lighting fixtures or stove hardware.

It has been suggested that scrap from the molding of standard melamine-formaldehyde plastic might provide a low-cost source of filler material. However, the cellulose present in such scrap is so thoroughly impregnated with the hardened melamine resin as to render the scrap, when powdered for use as a filler, practically non-absorbent for additional resinous reaction product. (A molding composition of the present invention may comprise as high as 80 per cent of a urea-formaldehyde resin and as low as 20 per cent of a resin-treated filler.)

When melamine-formaldehyde molding scrap is ground or powdered for use as an impregnated filler in a molding composition, plastic articles molded therefrom are of poor quality, crack easily, and, in general, present an inferior appearance. On the other hand, compositions of the invention produced from melamine resin-impregnated filler in accordance with the present method, in which the proportion of melamine resin is considerably less than that present in compositions which comprise ground scraps of melamine-formaldehyde plastic as a filler, possess superior physical properties as demonstrated herein.

Molding compositions of the invention produced by the present method have unusually good properties because they combine nearly all of the good qualities inherent in both standard urea-formaldehyde and melamine-formaldehyde compositions, and yet do not contain so much melamine as to be uneconomical to produce. It has been shown hereinbefore that compositions embodying the invention not only possess excellent water resistance, a property earnestly desired for plastic materials, but also possess other similarly good physical properties.

Using the procedure hereinbefore described for the preparation of a molding composition of the invention (A), three melamine-formaldehyde resin-treated cellulose fillers were prepared and then impregnated with a urea-formaldehyde reaction product in such proportions as to yield materials having the percentage compositions shown below:

|   | Percent Melamine resin | Percent Cellulose | Percent Urea resin |
|---|---|---|---|
| 1 | 3.2 | 36.8 | 60 |
| 2 | 6.6 | 35 | 58.4 |
| 3 | 18.0 | 27 | 55 |

A control molding composition, hereinafter referred to as composition 4, comprising 35 per cent of ordinary alpha cellulose and 65 per cent of a urea-formaldehyde reaction product (prepared according to the procedure hereinbefore described) was tested along with compositions 1, 2, and 3 embodying the invention for strength properties and shrinkage.

The strength tests employed were standard tests for plastic materials and are considered to be capable of showing generally the strength characteristics that are important in industrial plastic materials. A separate description of the procedure used in each test follows:

*Flexural strength (col. 2).*—A small bar (¼" x ½" x 6"), molded of the material to be tested for three minutes under a pressure of 5,000 lbs. per square inch in a mold heated with steam at 60 lbs. gauge pressure, is supported at its extremities and a transverse load is applied centrally. The flexural strength "S" is the extreme fiber stress in pounds per square inch at which the bar fails, calculated according to the formula $$S = \frac{3wl}{2ba^2}$$

in which "$w$" is the load in pounds, "$l$" is the length in inches of the bar or span between the supports, "$b$" is the horizontal dimension in inches of the cross section of the bar and "$a$" is the vertical dimension in inches of the cross section of the bar.

*Deflection (col. 3).*—The deflection of the bar used in the flexural strength test is measured at the instant the bar fails. The elastic modulus (in flexure) may be calculated from Young's formula $$M = \frac{mgl^3}{4sa^3b}$$

in which "$M$" is the modulus in pounds per square inch, "$mg$" (mass times gravity) is the load in pounds, "$l$" is the length in inches of the bar or span between supports, "$s$" is the deflection in inches, "$a$" is the vertical dimension in inches of the cross section of the bar and "$b$" is the horizontal dimension in inches of the cross section of the bar.

*Compressive strength (col. 4).*—A small bar ½" x ⅜" x 1" molded under the same conditions is subjected to a compressive force acting longitudinally until the bar crumbles or shatters. The compressive strength is the force "F" in pounds per square inch at which the bar fails, calculated according to the formula $$F = \frac{w}{ab}$$

in which "$w$" is load in pounds and "$a$" and "$b$" are the dimensions in inches of the cross section of the bar.

The results of the flexural strength, compressive strength and deflection tests for articles molded from compositions 1, 2, 3 and 4 are recorded in Table 2 below. The results indicate that the strength properties of articles molded from compositions of the invention are at least as good as the strength properties of urea-formaldehyde plastics.

Moreover, shrinkage tests for articles molded from compositions of the invention indicate that shrinkage properties are greatly improved in such articles. Shrinkage is the reduction in size of a molded article during cooling after molding, and the reduction in size during the useful life of the molded article. The contraction of a plastic upon being removed from the mold is called "initial shrinkage," this contraction of the plastic occurring, of course, upon cooling to room temperature. "Final shrinkage" is the shrinkage due to the evaporation of any water present within a plastic article, upon exposure of the article to the atmosphere for a prolonged period of time. To hasten the loss of this water, test samples are suspended above concentrated H₂SO₄ in an atmosphere maintained at 90° F. The test is run for three weeks. Samples of compositions 1, 2, 3 and 4 were molded into disks having a diameter of two inches, by the procedure hereinbefore described, and were tested for initial and final shrinkage. The results are recorded in Table 2 as inches of shrinkage per inch of the molded article before testing.

TABLE 2

| Composition | Flexural p. s. i. | Total deflection (inches) | Compressive p. s. i. | Initial Shrinkage (in./in.) | Final Shrinkage (in./in.) |
|---|---|---|---|---|---|
| 1 | 14,100 | 0.126 | 29,800 | 0.0065 | 0.0155 |
| 2 | 14,800 | 0.129 | 34,600 | 0.006 | 0.012 |
| 3 | 13,250 | 0.120 | 35,700 | 0.0065 | 0.013 |
| 4 | 13,750 | 0.128 | 30,100 | 0.0075 | 0.0155 |

The results of the shrinkage tests for the compositions of the invention are appreciably better than the shrinkage results for a standard urea-formaldehyde plastic. Compositions of the invention produce articles having substantially better shrinkage resistance. Good shrinkage properties are desirable, because reduced shrinkage lengthens the useful life of a molded article by minimizing the tendency toward cracking of the plastic article.

It has been shown that articles molded from compositions of the invention not only possess much better water resistance than standard urea-formaldehyde plastics, but also possess other properties which are at least as good and often much better than the corresponding properties of standard urea-formaldehyde plastics.

The advantageous properties of articles molded from compositions of the invention can be demonstrated by other tests. For example, plastic buttons, which are among the many commercially valuable plastic articles molded from compositions of the invention, can be tested by a button laundering test. In ordinary laundering, buttons are subjected to relatively hot alkaline solutions and then are subjected to fairly cold rinse water. Poor water resistance in the case of articles such as buttons results in cracked and warped buttons, or buttons having a generally poor appearance after several cycles of ordinary laundering. The superior water resistance of articles molded from compositions embodying the invention is illustrated by the button laundering test and also by the cosmetic jar lid test which are described below.

The button laundering test is essentially a test to determine the durability and water resistance of molded plastic articles (e. g., clothing buttons) that are frequently contacted by alkaline or acidic solutions. To compare molding compositions heretofore known with molding compositions of the instant invention, several suiting buttons were molded from the composition of the invention hereinbefore described as composition 2, the urea-formaldehyde control composition D, and a melamine-formaldehyde control composition E, in a standard men's suiting button mold. The buttons obtained were sewn onto a hand towel, and ten suiting buttons and two overcoat buttons molded from each composition were used for the test.

The melamine-formaldehyde control composition E was prepared as follows: A reaction mixture of melamine (126 grams), formalin (243 grams of a commercial 37 per cent aqueous formaldehyde solution) and triethanolamine (1 cc. of a 50 per cent aqueous solution) was heated with stirring to a temperature of about 80° C. This temperature was maintained for a total time of about 15 minutes. When the melamine had dissolved, the pH of the syrup was about 6.8. The reaction mixture was then cooled to a temperature of about 60° C., and the cooled syrup then was absorbed on alpha cellulose (115 grams bone dry weight). The impregnated material so obtained was dried in a circulating air oven at a temperature of about 170° F. for a total time of about one hour. The crisp, friable dried material was ground in a ball mill together with 0.1 per cent of hexamethylene tetramine, 0.125 per cent of o-sulfamido methyl benzoate, 1.0 per cent of toluene sulfonamide as a plasticizer, and 0.5 per cent of zinc stearate as a plate lubricant. The resulting powder was used to mold buttons as hereinbefore described for the button laundering test.

A cycle of the standard button laundering test used herein was begun by immersing and slushing each towel in an aqueous solution containing 0.1% of sodium carbonate and 0.2% of laundry soap maintained at a temperature of about 140° F., for a total time of about 10 minutes. Subsequently the towel was immersed and slushed in an aqueous solution containing 0.2% of sodium carbonate and 0.4% of laundry soap at a temperature of about 160° F. for a total time of 10 minutes. After this treatment the towel was rinsed in cold water for three minutes before being slushed in a 0.5% aqueous solution of acetic acid maintained at a temperature of about 110° F., for a total time of five minutes. The acetic acid treatment was followed by another rinse in cold water for a total time of three minutes, and then the towel was finally hung to dry at room temperature for 24 hours to complete the cycle. The buttons were examined after each cycle of this test, and the number of buttons remaining uncracked after the number of cycles indicated is recorded in Table 3 below.

TABLE 3

| Laundering Cycles completed | Composition 2 | Control Composition D | Control Composition E |
|---|---|---|---|
| 1 | 12 | 12 | 12 |
| 2 | 12 | 7 | 12 |
| 3 | 12 | 5 | 12 |
| 4 | 12 | 1 | 12 |
| 5 | 12 | 0 | 11 |
| 10 | 10 | | 11 |

The results of the button laundering test recorded in Table 3 indicate that there is substantially no difference in resistance to laundering between molded compositions embodying the invention and the much more expensive melamine-formaldehyde molded compositions which have been known heretofore to have superior resistance to laundering.

The cosmetic jar lid test further demonstrates the superior water resistance of plastics embodying the instant invention. Jar lids, each three inches in diameter, were molded at a temperature of about 305° F. from the molding compositions of the invention hereinbefore referred to as compositions 2 and 3 and from the control composition D. The test lids were filled with boiling water and were allowed to stand for 10 minutes. They were then emptied, dried, and placed in a 120° F. oven for 24 hours. This procedure constituted a cycle which was repeated until the surface of the jar lid cracked.

Compositions 2 and 3 of the invention sustained 10 cycles of the above procedure without cracking, whereas an ordinary urea-formaldehyde molding composition (control D) was badly cracked after only three cycles.

Although the compositions of the invention employed in the tests hereinbefore described comprise melamine-formaldehyde resin-treated cellulose fillers, compositions comprising other heterocyclic polyamine-formaldehyde resin-treated cellulose fillers also have good chemical and physical properties, as demonstrated below:

(a) A suspension of adipoguanamine (36.8 grams) in formalin (64.8 grams of a commercial 37 per cent aqueous formaldehyde solution) was diluted with water (406 grams) and ethylene glycol monomethylether (100 grams) and was refluxed for about 20 minutes, at a temperature of about 100° C. until a clear water-soluble resin was obtained having a pH of approximately 6.8. The reaction product so formed was absorbed on cellulose (308 grams bone dry), the pH of the mixture being adjusted to about 4½ to 5 by the addition of lactic acid (8 cc. of 10% solution). The impregnated filler so obtained was then baked for six days at a temperature of about 190° F. to completely cure the resinous reaction product on the cellulose.

(b) A solution of guanazole (49.5 grams) in water (665 grams) was prepared. Formalin (81 grams of a commercial 37 per cent aqueous formaldehyde solution) was added to the guanazole solution and the pH was adjusted to just below 6 by the addition of lactic acid. The resulting solution was absorbed on cellulose (401.5 grams, bone dry). The impregnated filler was then dried for five days at a temperature of about 190° F. to completely cure the resinous reaction product thereon.

Each treated filler prepared as described in (a) and (b) above was further impregnated with a solution of a urea-formaldehyde reaction product, prepared as hereinbefore described, and the impregnated material was thoroughly dried and ground into a powdered molding composition, by the procedure hereinbefore described. In each case the proportion of treated filler and of urea-formaldehyde resin solution was such that the final dry molding composition comprised 40 per cent of the treated filler and 60 per cent of the urea-formaldehyde reaction product. The composition containing the adipoguanamine-formaldehyde resin-treated filler is hereinafter referred to as composition 5 and the composition containing the guanazole-formaldehyde resin-treated filler is hereinafter referred to as composition 6. (The adipoguanamine-formaldehyde resin and the guanazole-formaldehyde resin comprised 16.5 per cent of the treated fillers.)

The composition of the invention hereinbefore described as composition 2, which comprises a melamine-formaldehyde resin-treated filler, and compositions 5 and 6 were molded into test disks which were tested for water resistance and for resistance to cracking upon subjection to extreme changes of temperature and humidity by the procedure hereinbefore described. The results of these tests are shown in Table 4 below. For the sake of comparison, the test results obtained on an ordinary urea-formaldehyde molding composition, hereinbefore referred to as composition D, are also included in Table 4.

TABLE 4

| Molding composition | Water Absorption—Molding time in minutes | | | |
|---|---|---|---|---|
| | ¾ | 1 | 2 | 3 |
| D | 0.175 cr. | 0.170 cr. | 0.150 cr. | 0.145 cr. |
| 2 | 0.170 sl. cr. | 0.115 sl. cr. | 0.085 v. sl. cr. | 0.080 v. v. sl. cr. |
| 5 | 0.175 cr. | 0.150 sl. cr. | 0.115 cr. | 0.110 v. sl. cr. |
| 6 | 0.145 sl. cr. | 0.130 sl. cr. | 0.100 sl. cr. | 0.095 sl. cr. |

As the results in Table 4 indicate, a urea-formaldehyde molding composition of the invention which comprises a cellulose filler impregnated with a thermosetting reaction product of formaldehyde and melamine (2), or formaldehyde and adipoguanamine (5), or formaldehyde and guanazole (6), can be molded to produce articles having considerably higher water resistance than a urea-formaldehyde molding composition which comprises an ordinary cellulose filler, control D. The compositions of the invention also show considerably greater resistance to cracking upon subjection to extreme changes of temperature and humidity than the control composition. It is also evident from the results in Table 4 that a composition of the invention which comprises a melamine-formaldehyde treated filler has even better properties than a composition of the invention in which the heterocyclic polyamine which is reacted with formaldehyde comprises, for example, adipoguanamine or guanazole.

It has been demonstrated that molding compositions embodying the invention are superior to standard urea-formaldehyde plastics. Furthermore, the superior water resistance and heat resistance of melamine-formaldehyde plastics and the superior color qualities, translucency, and strength properties of urea-formaldehyde plastics are combined in molding compositions of the invention; yet compositions of the invention can be produced nearly as economically as standard urea-formaldehyde plastics.

*Preparation of laminates*

A laminating material may be prepared by a procedure similar to that hereinbefore described for the preparation of a molding composition except, of course, that the cellulose ingredient consists of sheets of cellulosic material (e. g., paper or cloth). The cellulose sheets are first impregnated with a heterocyclic polyamine-formaldehyde reaction product, and the reaction product is completely cured before the cellulose sheets are coated with the binder (i. e., a urea-formaldehyde reaction product, as hereinbefore described), prior to a hot-pressing operation in accordance with the usual procedure for producing laminates.

In the preferred method of preparing impregnated cellulose sheets for use in a laminate embodying the invention, a cellulose cloth or paper is dipped in a solution of a heterocyclic polyamine formaldehyde reaction product and then dried, preferably at an elevated temperature, in order to convert the reaction product to the infusible state. It may be desirable to use a cellulose cloth which includes other fibers such as glass or asbestos interwoven with the cellulose fibers. As a practical matter, in an industrial application, pulp in a paper machine may be pretreated by the manufacturer so as to produce paper sheets already impregnated with a substantially infusible reaction product. Other methods of impregnating cellulose laminating materials, such as spraying or brushing an aqueous or organic solvent solution of the intermediate reaction product onto the material, may also be employed.

It is preferred that the proportion of a heterocyclic polyamine-formaldehyde reaction product solution used to impregnate the cellulose sheets be such that about 10 to 20 per cent of the final treated dry cellulose sheets consists of the heterocyclic polyamine-formaldehyde reaction product in its infusible state.

The proportion of urea-formaldehyde reaction product to resin-treated plies should be such that approximately 40 to 60 per cent of the final cured laminate consists of the resin-treated cellulose plies.

The following examples illustrate the practice of the invention:

EXAMPLE 1

A reaction mixture of a heterocyclic polyamine (67.5 grams of melamine) and formalin (130 grams) is reacted for five minutes at a temperature ranging from 90 to 95° C. The resulting reaction mass is then diluted with water to 1000 cc. and the pH is adjusted to about 5 to 6 by the addition of lactic acid (0.5 cc. of a 10 per cent lactic acid solution). The solution of the reaction product is absorbed on alpha cellulose (337.5 grams, bone dry weight) and the resulting material is dried for several hours at a temperature of about 200° to 220° F. The dried filler (450 grams) is then impregnated with a solution of a urea-formaldehyde reaction product (550 grams), prepared by reacting a solution of urea (372 grams) and formalin (752 grams) at a temperature of about 30° C. and at a pH of about 7 for about six hours. The material so obtained is dried for approximately one hour at a temperature of about 185° F. Subsequently the dried material is ground in a ball mill with 0.1 per cent of hexamethylene tetramine, 0.25 per cent of ethylene glycol toluene sulfonate as an accelerator, 1.0 per cent of toluene sulfonamide as a plasticizer, and 0.5 per cent of zinc stearate as a plate lubricant, to obtain a powdered molding composition of the invention, which can be molded into articles having superior water resistance, resistance to shrinkage, etc.

EXAMPLE 2

A reaction mixture of a heterocyclic polyamine (47.7 grams of benzoguanamine) and formalin (48.6 grams) is heated to the boiling point to dissolve substantially all of the benzoguanamine within about 3 minutes. The hot solution is diluted with methanol (250 grams) and water (311 grams) to obtain a clear solution. Lactic acid is added to adjust the pH to approximately 4½ to 5. This solution is absorbed on alpha cellulose (334 grams, bone dry weight) and the resulting product is dried and cured for seven days at a temperature of about 190° F.

The resulting dried impregnated filler (400 grams) is further impregnated with a solution of urea-formaldehyde reaction product (600 grams), prepared by reacting a solution of urea (405 grams) and formalin (908 grams) for six hours at a temperature of about 30° C. and at a pH of about 7. The product so obtained is dried for approximately one hour at a temperature of about 185° C. and is then ground in a ball mill with 0.1 per cent of hexamethylene tetramine, 0.25 per cent of ethylene glycol toluene sulfonate as an accelerator, 1.0 per cent of toluene sulfonamide as a plasticizer, and 0.5 per cent of zinc stearate as a plate lubricant. The resulting powdered composition may be molded into articles having good water resistance and very good resistance to shrinkage.

Having described the invention we claim:

1. A method of producing a material that can be hot pressed to produce articles of greatly improved water resistance, which comprises impregnating cellulose with a thermosetting reaction product of formaldehyde and a substance whose molecule has a plurality of $NH_2$ groups each connected to a carbon atom contained in a heterocyclic ring, the ring consisting of from five to six carbon and nitrogen atoms of which not more than three are nitrogen atoms, the carbon atom being connected by a double bond to an intracyclic nitrogen atom, converting the reaction product to its infusible state, the amount of the reaction product being such that 2.5 to 40 per cent of the treated cellulose consists of the infusible reaction product, and then thoroughly impregnating the cellulose with an aqueous solution of a thermosetting urea-formaldehyde reaction product, and drying.

2. A method as claimed in claim 1 wherein the substance is melamine.

3. A molding composition that gives molded articles of greatly improved water resistance, prepared by the method of claim 2.

4. A molding composition that gives molded articles of greatly improved water resistance, prepared by the method of claim 1.

DAVID E. CORDIER.
WILLIAM D. WILLIAMS.

References Cited in the file of this patent

UNITED STATES PATENTS

| Number | Name | Date |
|---|---|---|
| 2,280,934 | Seebach | Apr. 28, 1942 |
| 2,411,554 | Riccitiello | Nov. 26, 1946 |
| 2,542,484 | Debing | Feb. 20, 1951 |